(12) United States Patent
Lyon

(10) Patent No.: US 9,821,422 B2
(45) Date of Patent: Nov. 21, 2017

(54) DRILL BIT FOR A DOWN-THE-HOLE DRILL HAMMER HAVING SPIRALLY ARRANGED CUTTING INSERTS

(71) Applicant: Center Rock Inc., Berlin, PA (US)

(72) Inventor: Leland H. Lyon, Roanoke, VA (US)

(73) Assignee: Center Rock Inc., Berlin, PA (US)

( * ) Notice: Subject to any disclaimer, the term of this patent is extended or adjusted under 35 U.S.C. 154(b) by 236 days.

(21) Appl. No.: 14/718,673

(22) Filed: May 21, 2015

(65) Prior Publication Data

US 2015/0345227 A1    Dec. 3, 2015

Related U.S. Application Data

(60) Provisional application No. 62/004,447, filed on May 29, 2014.

(51) Int. Cl.
| | |
|---|---|
| *E21B 10/36* | (2006.01) |
| *E21B 10/62* | (2006.01) |
| *B23P 15/28* | (2006.01) |
| *E21B 10/46* | (2006.01) |

(52) U.S. Cl.
CPC .............. *B23P 15/28* (2013.01); *E21B 10/36* (2013.01); *E21B 10/46* (2013.01); *Y10T 29/49996* (2015.01)

(58) Field of Classification Search
CPC .......... E21B 10/36; E21B 10/62; E21B 10/445
See application file for complete search history.

(56) References Cited

U.S. PATENT DOCUMENTS

| | | | | |
|---|---|---|---|---|
| 4,073,354 A | * | 2/1978 | Rowley | .................. E21B 10/26 175/391 |
| 4,323,130 A | * | 4/1982 | Dennis | .................. E21B 10/567 175/393 |
| 2009/0321143 A1 | | 12/2009 | Lyon | |
| 2011/0240373 A1 | | 10/2011 | Lyon et al. | |

* cited by examiner

*Primary Examiner* — Cathleen R Hutchins
(74) *Attorney, Agent, or Firm* — Kim Winston LLP

(57) ABSTRACT

A drill bit for a down-the-hole drill hammer is provided that includes a head and a shank extending from the head. The head includes a plurality of non-concentrically or spirally arranged cutting members about its working face. The non-concentric or spiral arrangement of the cutting members in the drill bit and their overlapping cutting paths during rotation of the drill bit reduces the presence of concentric grooves or valleys being cut into the earthen terrain impacted by the bit thereby resulting in more complete cutting coverage.

13 Claims, 6 Drawing Sheets

DRILL BIT FOR A DOWN-THE-HOLE DRILL HAMMER HAVING SPIRALLY ARRANGED CUTTING INSERTS

CROSS-REFERENCE TO RELATED APPLICATIONS

This application claims the benefit of U.S. Provisional Application No. 62/004,447, filed May 29, 2014, the entire disclosure of which is incorporated by reference herein in its entirety.

BACKGROUND OF THE INVENTION

The present invention relates generally to down-the-hole drill (DHD) hammers. In particular, the present invention relates to a drill bit with nonconcentrically arranged or spirally arranged cutting inserts for a down-the-hole drill hammer.

Typical DHDs include a hammer having a piston that is moved cyclically with high pressure gas (e.g., air). The piston generally has two end regions that are exposed to working air volumes (i.e., a return volume and a drive volume) that are filled and exhausted with each cycle of the piston. The return volume pushes the piston away from its impact point on a bit end of the hammer. The drive volume accelerates the piston toward its impact location on the back end of the drill bit. The overall result is a percussive drilling action.

Conventional drill bits used in DHD applications are typically constructed to include cutting inserts that are positioned at a bottom end face of the drill bit. The cutting inserts serve to cut rock or other material upon impact and the drill bit is rotated or indexed a certain amount after each cycle of the piston to reposition the cutting inserts upon a different region of a bore hole.

A typical DHD hammer includes a drill bit having cutting inserts arranged in concentric rings in the distal face or cutting face of the drill bit. In most cases, the rings are separated by at least the diameter of the cutting inserts whereby the concentrically arranged cutting inserts produce concentric grooves or valleys in the rock being drilled as the drill bit rotates and the percussive action penetrates the cutting inserts into the earth. The development of such concentric grooves or valleys increases the energy required for rock breakage. In addition, it is known that rock breakage due to blunt penetration is more efficient when free faces are in close proximity to the Hertzian stress field created during the rock loading process below the point of penetration. For example, it is easier to break a convex rock shape than a concave one. It would therefore be desirable to have drill bits that minimize or eliminate the degree of concentric grooving created by the concentric placement of cutting inserts in conventional drill bits.

BRIEF SUMMARY OF THE INVENTION

According to an aspect of the present invention, there is provided a drill bit for a down-the-hole drill hammer that includes a shank and a head extending from the shank. The head includes a plurality of cutting members arranged in a spiral or nonconcentric configuration.

According to another aspect of the present invention, there is provided a down-the-hole drill hammer that includes a housing, a piston housed within the housing, and a drill bit about a distal end of the housing. The drill bit includes a head having a plurality of cutting members arranged in a nonconcentric or spiral configuration.

According to yet another aspect of the present invention, there is provided a drill bit for a down-the-hole drill hammer that includes a shank and a head extending from the shank. The head includes a first cutting member defining a first circumferential cutting path and a second cutting member defining a second circumferential cutting path that overlaps the first circumferential cutting path.

According to another aspect of the present invention, there is provided a method of manufacturing a drill bit for a down-the-hole drill hammer that includes forming spaced apart receiving holes in a drill bit face of the drill bit in a nonconcentric or spiral configuration. The method further includes forming a plurality of receiving holes in the drill bit face arranged in a circumferential configuration circumscribing the spaced apart receiving holes in the drill bit face arranged in the nonconcentric or spiral configuration.

The problems associated with grooves or valleys cut into rock by drill bit cutting inserts arranged in concentric rings are solved by engendering a drill bit for a DHD hammer in which the drill bit cutting members or cutting inserts are arranged in a nonconcentric or spiral pattern about the distal face of the drill bit. With such a drill bit, a DHD hammer can be constructed which will effectively improve the overall performance of the DHD hammer's drilling operation by eliminating e.g., spaced apart concentric grooving during drilling operations.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

Figure 1:
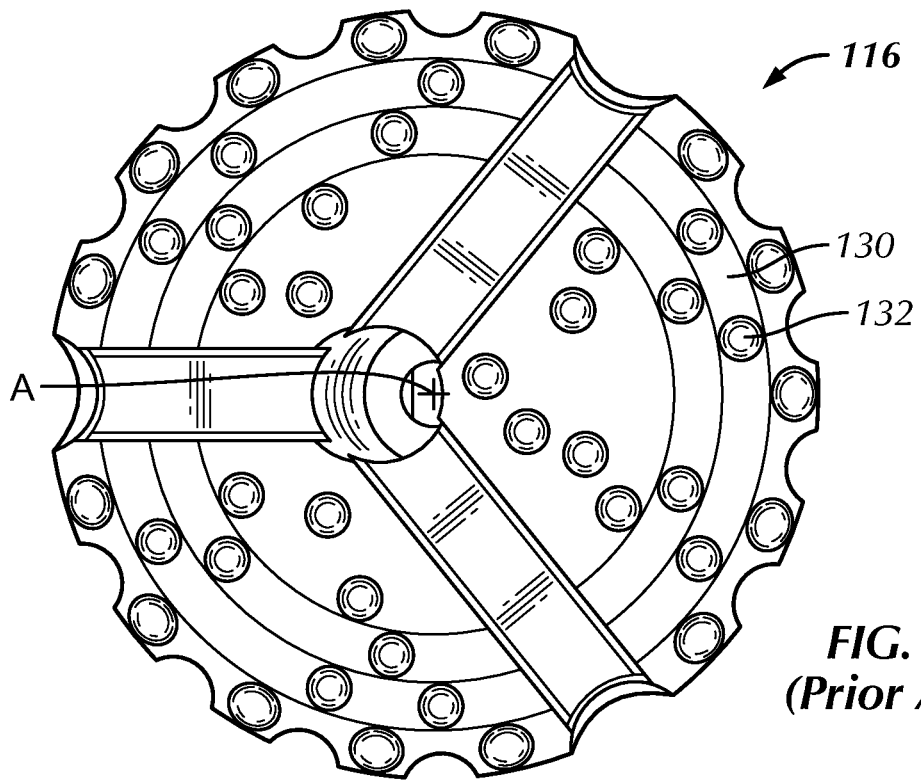
FIG. 1 is a bottom plan view of a distal face of a conventional down-the-hole drill hammer drill bit.

Referring to FIG. 1, there is shown a distal face, working face or cutting face 130 of a conventional DHD hammer drill bit 116. As seen in FIG. 1, cutting face 130 is provided with a plurality of cutting members or inserts 132 which are arranged in pattern forming concentric rings about a central longitudinal axis "A" of the drill bit 116. In conventional designs such as shown in FIG. 1, the rings are separated by at least the diameter of the inserts, or at least small radial gaps exist between the inserts. Such concentrically arranged inserts produce concentric grooves or valleys in rock/earthen terrain being drilled as the drill bit rotates and the percussive action of the DHD hammer penetrates the inserts into the rock. The working face 130 of the drill bit typically includes two, three, four or more circular patterns of cutting inserts where each circular pattern is equidistantly spaced in a radial direction.

Figure 2:
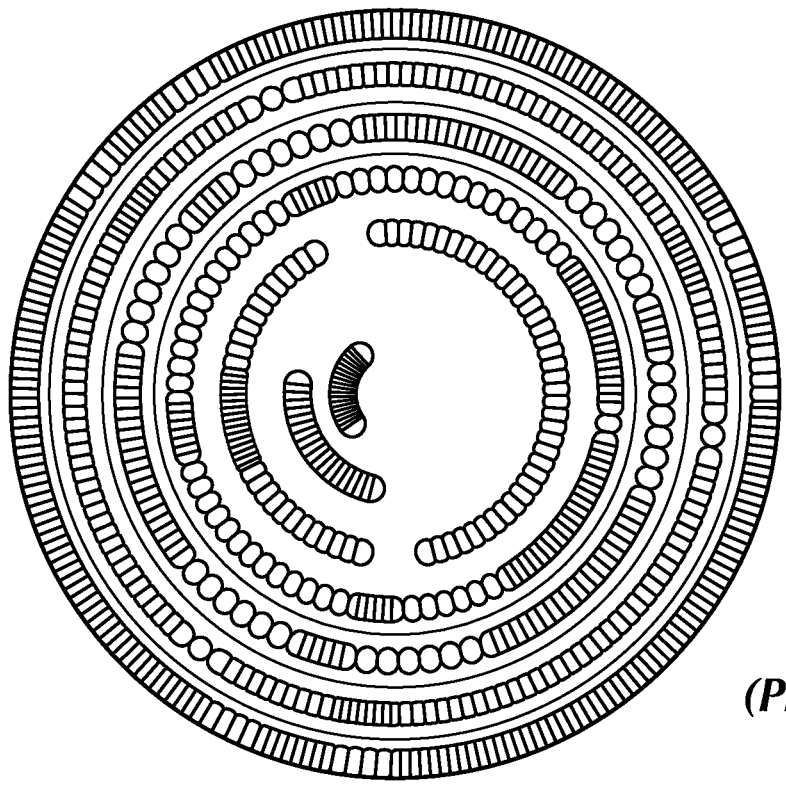
FIG. 2 is a view depicting a simulation of concentric cutting patterns resulting from the conventional down-the-hole drill hammer drill bit of FIG. 1.

FIG. 2 reflects concentric grooves or valleys that are cut into earthen terrain or rock by the cutting members 132 arranged in concentric rings about the distal face of the drill bit. Among the disadvantages of such grooves or valleys is that the raised ridges between the valleys increases the overall amount of energy required for subsequent drilling/breakage of rock. For example, Hertzian stress fields are created when cutting inserts are loaded against rock and intended to create chips along planes reaching a free rock surface. The grooves or valleys created by concentrically placed cutting inserts place free rock surfaces further away from the Hertzian stress field, thus making chipping less likely or more difficult.

Figure 3:
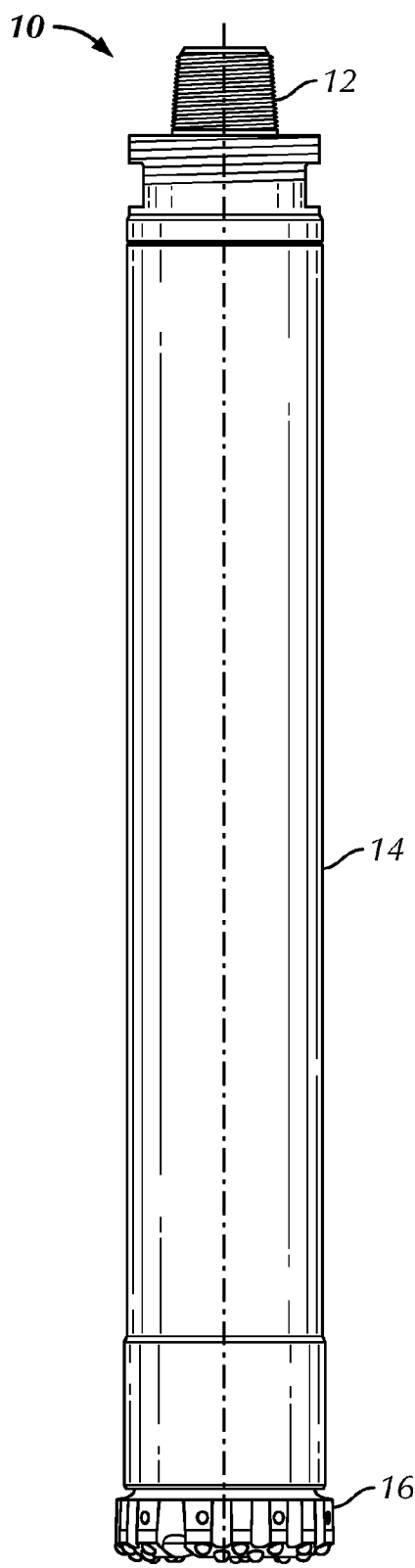
FIG. 3 is a side elevation view of a down-the-hole drill hammer in accordance with a preferred embodiment of the present invention.
Figure 4:
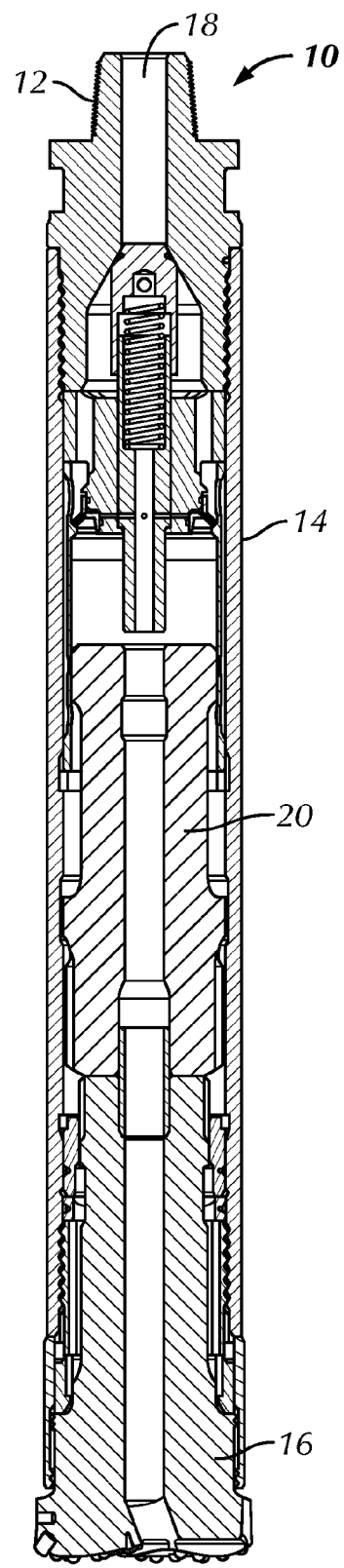
FIG. 4 is a cross-sectional side elevation view of the down-the-hole drill hammer of FIG. 3.

Referring to FIGS. 3 and 4, in accordance with a preferred embodiment, the present invention provides a DHD hammer 10, as shown. The DHD hammer 10 includes a backhead 12 for connecting to a drill string (not shown), a casing or housing 14, and a drill bit 16. The backhead 12 includes a supply inlet 18 for receiving working fluids from the drill string. The feed of supply air (i.e., working fluids) passes through the supply inlet into the internals of the DHD hammer to thereby percussively drive and operate the DHD hammer, in a manner generally known in the art. Such working of the internals of the DHD hammer are known in the art and a detailed discussion of such is not necessary for a full understanding of the present invention. However, further discussion of the internal working of a DHD hammer applicable to the embodiments of the present invention are disclosed in U.S. Patent Application Publication Nos. 2009/0321143 and 2011/0240373, the entire disclosures of which are hereby incorporated by reference herein in their entirety for all purposes. The DHD hammer 10 also includes a piston 20 that reciprocatively and percussively moves within the housing 14 in a well-known manner for impacting the drill bit 16.

Figure 5:
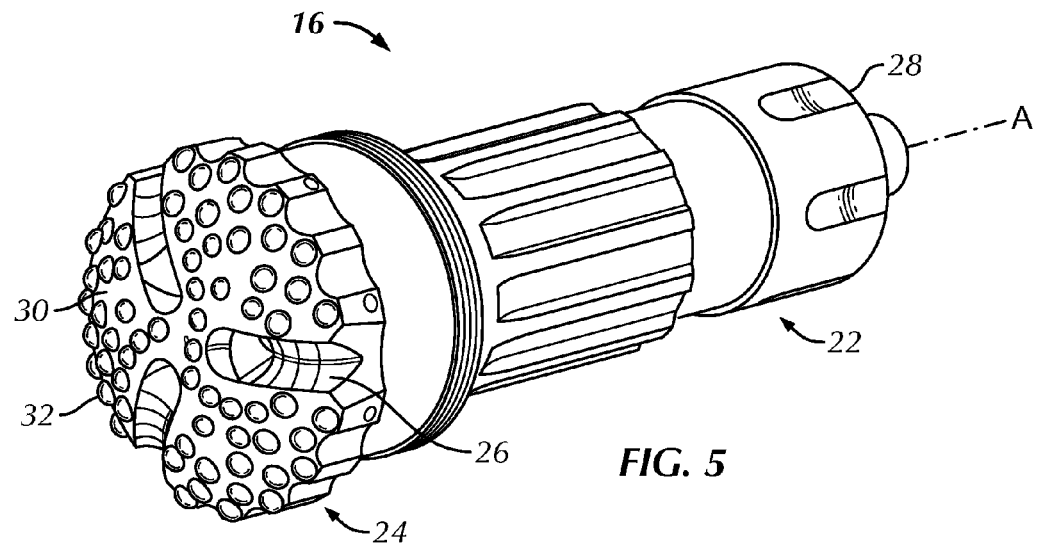
FIG. 5 is a perspective view of a drill bit of the down-the-hole drill hammer of FIG. 3.
Figure 8:
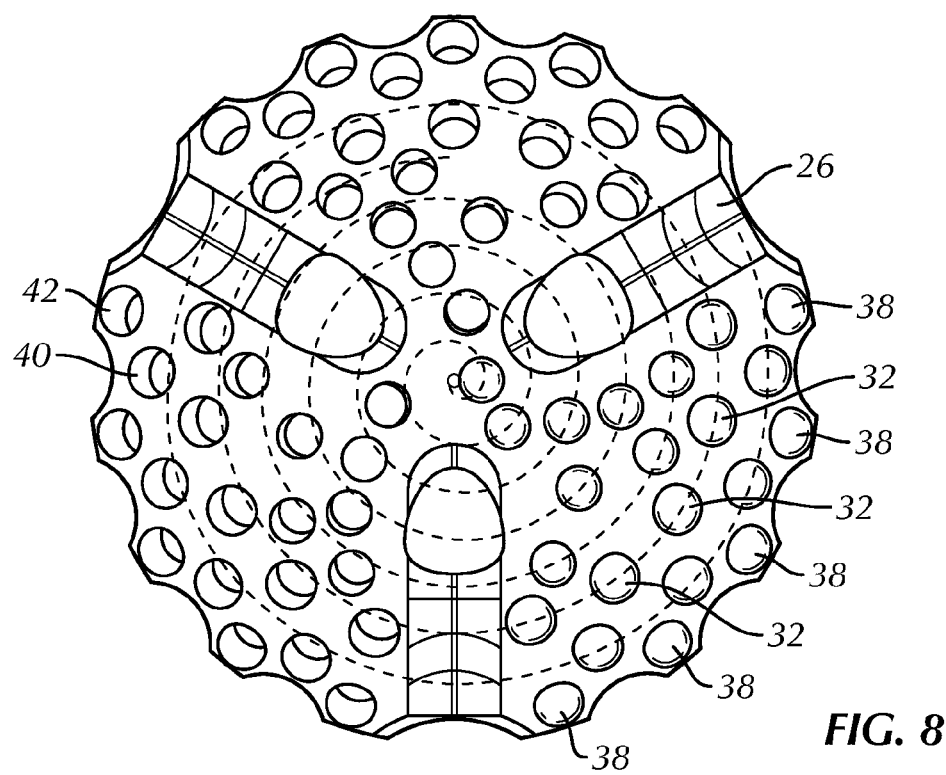
FIG. 8 is a view similar to FIG. 6 which further illustrates an imaginary spiral curve overlaid on the arrangement of cutting inserts and receiving holes of the drill bit of FIG. 5.

Referring to FIG. 5, the DHD hammer 10 includes the drill bit 16 having a shank 22 and a head 24 extending from the shank. The shank 22 extends from the head 24 an axial length about two to three times the axial length of the head 24, but can alternatively be configured more or less than two to three times the axial length. As will be discussed in greater detail herebelow, the head 24 includes a plurality of cutting members 32 arranged in a nonconcentric or spiral configuration about the distal face of the drill bit. The nonconcentric configuration can be a three dimensional nonconcentric configuration, a circumvolute configuration, or the like. The spiral can be a three dimensional spiral, a circumvolute configuration or the like. In an aspect, the convolute configuration can be one wherein the arrangement of cutting members is configured such that a line connecting the cutting members is rolled about a central longitudinal axis of the drill bit. FIG. 8 illustrates an imaginary spiral overlaid on top of the plurality of cutting members 32 showing the spiral configuration of the cutting members inserted in the drill bit to enhance the reader's ability to envision the nonconcentric or spiral placement of the cutting members about the distal face. The head can also include one or more air/gas ports 26 extending along the distal face of the drill bit in a radial direction.

The shank 22 is configured as best shown in FIG. 5 and includes an impact surface 28 upon which piston 20 cyclically impacts. The impact surface 28 faces upwardly and in a direction opposite a distal face or working face 30 of the drill bit which is intended to impact a drilling target e.g., engage earthen terrain.

Figure 9:
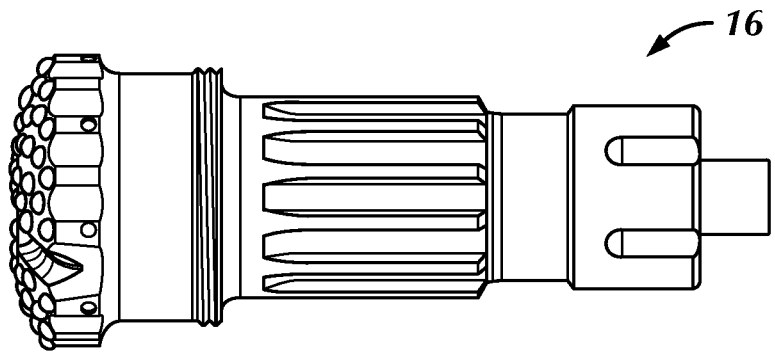
FIG. 9 is a right side elevation view of the drill bit of FIG. 5.
Figure 10:
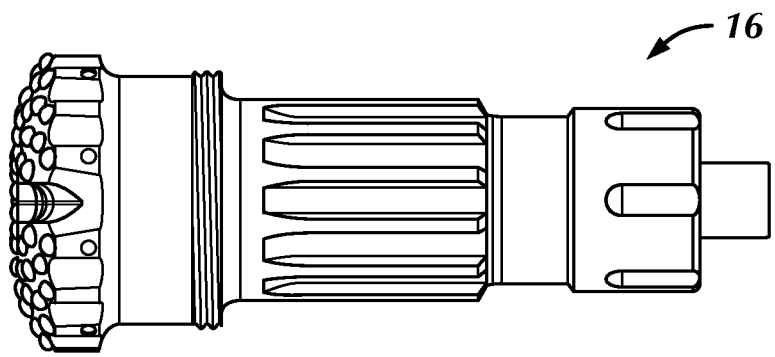
FIG. 10 is a front side elevation view of the drill bit of FIG. 5.
Figure 11:
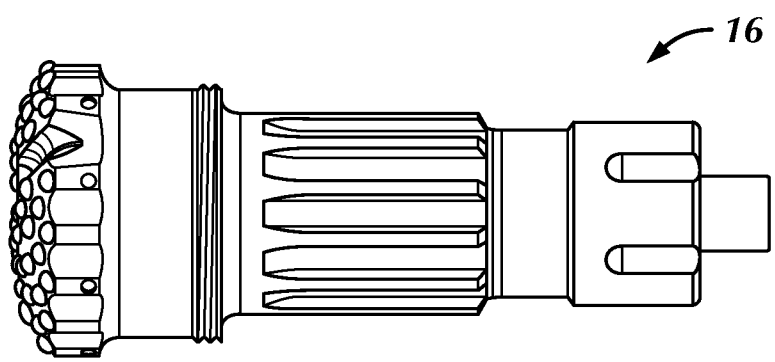
FIG. 11 is a left side elevation view of the drill bit of FIG. 5.
Figure 12:
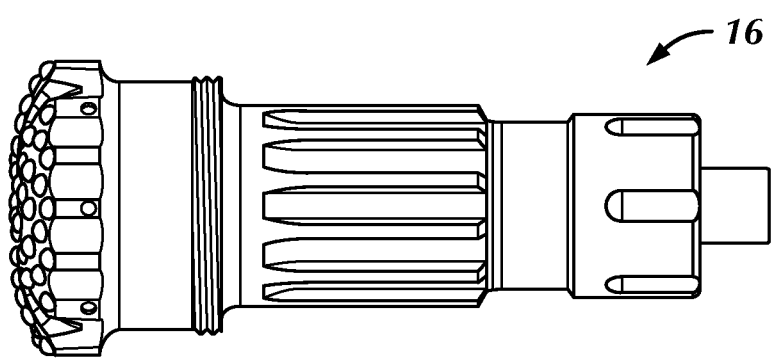
FIG. 12 is a rear side elevation view of the drill bit of FIG. 5.
Figure 13:
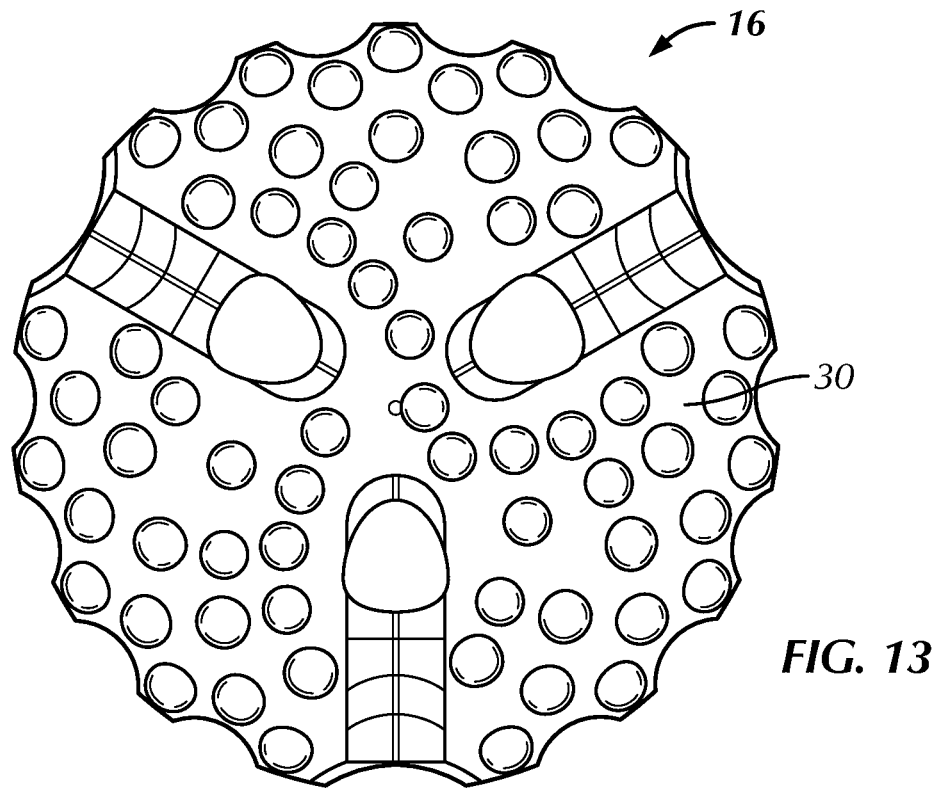
FIG. 13 is another bottom plan view of the drill bit of FIG. 5.
Figure 14:
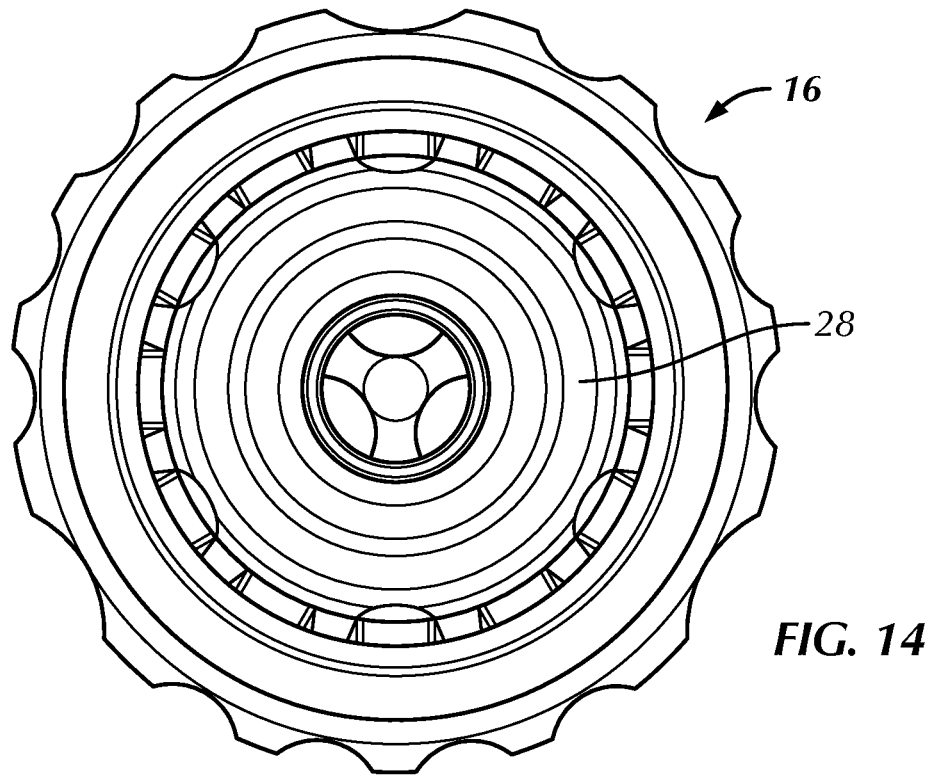
FIG. 14 is a top plan view of the drill bit of FIG. 5.

Referring to FIGS. 5 and 9, the distal face is generally convex in shape or of a generally spherical cap-like configuration. This generally convex shape of the distal face of the head allows for the arrangement of the cutting members in a three dimensional spiral configuration or a three dimensional nonconcentric configuration.

Referring back to FIGS. 5, 6 and 8, the plurality of cutting members 32 are arranged about the distal face 30. The cutting members 32 are arranged in a nonconcentric or spiral manner about a central longitudinal axis A of the drill bit 16.

Preferably, the cutting members 32 are arranged in a spiral configuration or convoluted configuration. As shown e.g., in FIG. 8, the spiral configuration emanates from about the central longitudinal axis A. In other words, the configuration of cutting members 32 are arranged in a convoluted manner defining the pattern as shown in FIG. 8.

Figure 6:
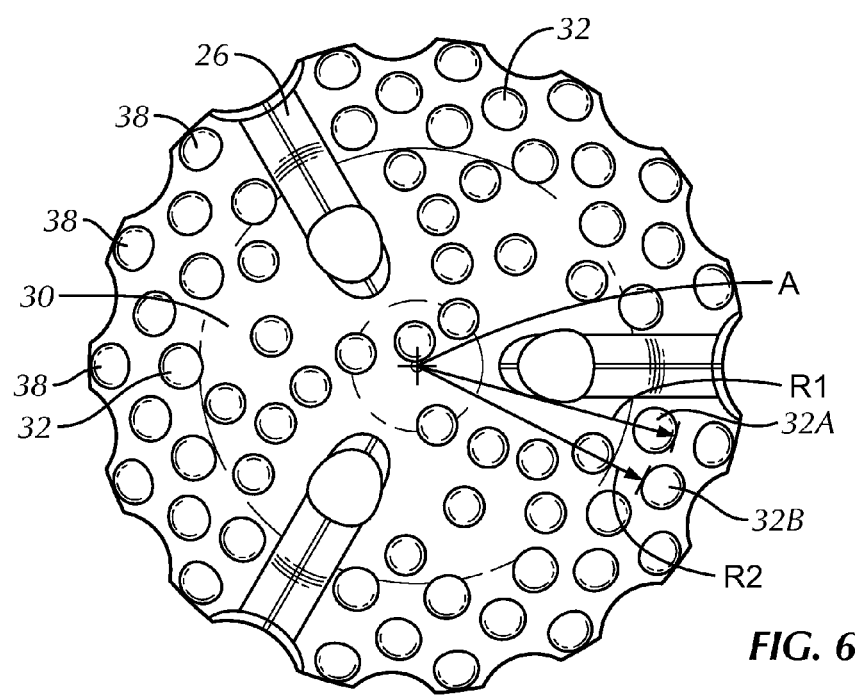
FIG. 6 is a bottom plan view of the drill bit of FIG. 5.
Figure 7:
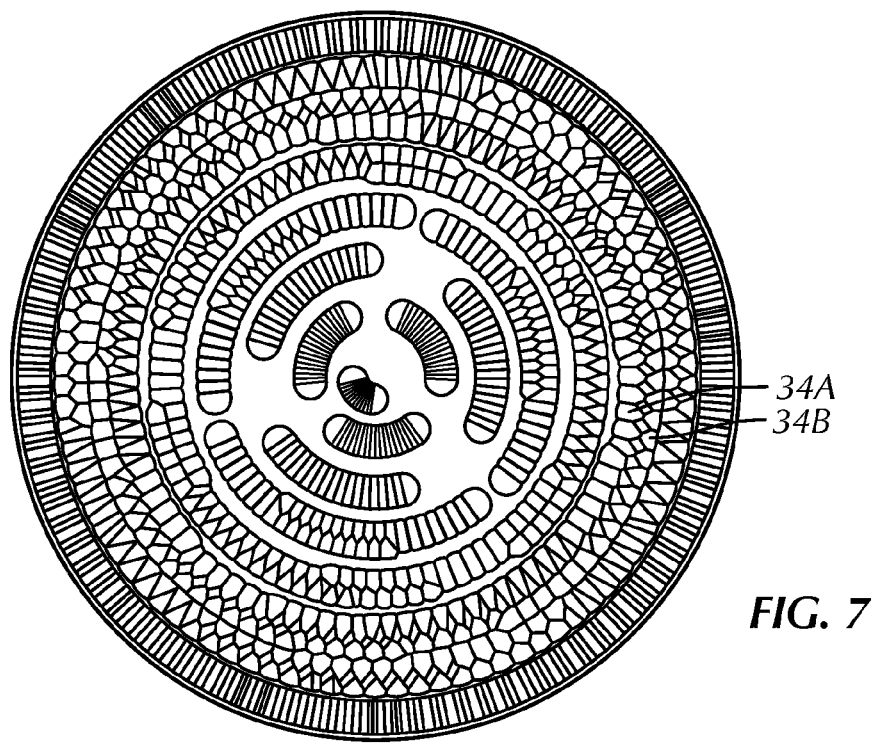
FIG. 7 is a view depicting a simulation of cutting patterns of the down-the-hole drill hammer drill bit of FIG. 6.

FIGS. 6 and 7 further illustrate the spiral arrangement of the plurality of cutting members 32 and the resulting advantageous cutting profile. The plurality of cutting members include a first individual cutting member or first cutting member 32A (FIG. 6) about a volution of the spiral defining a first circumferential cutting path 34 and a second individual cutting member or second cutting member 32B about an adjacent volution of the spiral defining a second circumferential cutting path 34B that overlaps the first circumferential cutting path. As such, the grooves created by the first and second individual cutting members 32A, 32B overlap to form overlapping grooves that are cut into the earthen terrain or rock when the drill bit is actuated and rotated about the central longitudinal axis. As used herein, the phrase "defining a cutting path" or "defining a circumferential cutting path" means the grooves, indentations or cutting profile created by the drill bit's cutting inserts as the drill bit is percussively driven to drill into rock/earthen terrain and rotated. Such overlapping grooves or cutting paths advantageously reduces the overall amount of energy required to subsequently break/drill further into the bore hole.

Alternatively expressed, the plurality of cutting members 32 arranged in the spiral configuration define a spiral emanating from about the central longitudinal axis A of the drill bit 16. The plurality of cutting members includes a first individual cutting member 32A along a volution of the spiral having a maximum radial distance R1 from the central longitudinal axis A that is greater than a minimum radial distance R2 from the central longitudinal axis A of a second individual cutting member 32B along an adjacent volution of the spiral. That is R1>R2.

The foregoing arrangement of the plurality of cutting members is equally applicable to a plurality of cutting members arranged in a nonconcentric configuration or circumvoluted configuration. When arranged in a nonconcentric configuration or circumvoluted configuration, the plurality of cutting members include a first individual cutting member about a volution of the nonconcentric configuration or circumvoluted configuration, respectively, defining a first circumferential cutting path and a second individual cutting member about an adjacent volution of the nonconcentric configuration or circumvoluted configuration, respectively, defining a second circumferential cutting path that overlaps the first circumferential cutting path. Moreover, the plurality of cutting members arranged in the circumvoluted configuration is about the central longitudinal axis A of the drill bit 16. In other words, the plurality of cutting members includes a first individual cutting member along a volution of the nonconcentric configuration or circumvoluted configuration having a maximum radial distance R1 from the central longitudinal axis A that is greater than a minimum radial distance R2 from the central longitudinal axis A of a second individual cutting member 32B along an adjacent volution of the nonconcentric configuration or circumvoluted configuration, respectively.

Referring again to FIG. 6, the distal face or working face 30 of drill bit 16 preferably includes another plurality of cutting members 38 arranged in circumferential configuration circumscribing the first plurality of cutting members 32 arranged in the nonconcentric or spiral configuration. The cutting members 38 are also arranged in a circumferential configuration circumscribing the first and second cutting members. The plurality of cutting members 38 are preferably arranged adjacent the outer circumference of the drill bit head.

In accordance with another preferred embodiment, the present invention provides a method of manufacturing a drill bit for a down-the-hole drill hammer. The method includes forming spaced apart receiving holes 40 (FIG. 8) about the distal face 30 of the drill bit 16 in a nonconcentric or spiral configuration. Further, the method includes forming a plurality of receiving holes 42 in the drill bit face arranged in a circumferential configuration circumscribing the spaced apart receiving holes 40 in the drill bit face arranged in the nonconcentric or spiral configuration. The nonconcentric configuration of receiving holes can be configured as a three dimensional nonconcentric pattern and the spiral configuration can be configured as a three dimensional spiral configuration.

It will be appreciated by those skilled in the art that changes could be made to the preferred embodiments described above without departing from the broad inventive concept thereof. For example, additional components can be added to the drill bit or alternative shapes of the cutting member or distal face can be used. It is to be understood, therefore, that this invention is not limited to the particular embodiments disclosed, but it is intended to cover modifications within the spirit and scope of the present invention as defined by the claims.

I claim:

1. A drill bit for a down-the-hole drill hammer comprising:
   a shank; and
   a head extending from the shank, the head including:
      a plurality of cutting members arranged in a spiral configuration having a plurality of volutions, wherein the plurality of cutting members includes an individual cutting member along each of the plurality of volutions of the spiral configuration such that grooves created by each individual cutting member overlaps grooves created by an individual cutting member of an adjacent volution, and
      a plurality of cutting members arranged in a circumferential configuration circumscribing the plurality of cutting members arranged in the spiral configuration, wherein the plurality of cutting members arranged in the circumferential configuration creates grooves that overlap grooves created by one of the plurality of cutting members arranged in the spiral configuration.

2. The drill bit of claim 1, wherein the spiral configuration is a three dimensional configuration.

3. The drill bit of claim 1, wherein the head includes a distal face for engaging earthen terrain and the plurality of cutting members are arranged about the distal face.

4. A down-the-hole drill hammer comprising:
   a housing;
   a piston housed within the housing; and
   a drill bit about a distal end of the housing, the drill bit including a head having:
      a first plurality of cutting members arranged in a spiral configuration, and
      a second plurality of cutting members arranged in a circumferential configuration circumscribing the first plurality of cutting members arranged in the spiral configuration, wherein a maximum radial distance of the first plurality of cutting members from a central longitudinal axis of the drill bit is greater than a minimum radial distance of the second plurality of cutting members from the central longitudinal axis.

5. The down-the-hole drill hammer of claim 4, wherein the spiral configuration is a circumvoluted configuration.

6. The down-the-hole drill hammer of claim 5, wherein the plurality of cutting members arranged in the circumvoluted configuration include a first individual cutting member about a volution of the circumvoluted configuration is spaced apart from a second individual cutting member about an adjacent volution of the circumvoluted configuration such that grooves created by the first and second individual cutting members overlap when the drill bit is actuated and rotated about the central longitudinal axis.

7. The down-the-hole drill hammer of claim 5, wherein the plurality of cutting members arranged in the circumvoluted configuration is about the central longitudinal axis of the drill bit.

8. The down-the-hole drill hammer of claim 4, wherein the head includes a distal face for engaging earthen terrain and the plurality of cutting members are arranged about the distal face.

9. A drill bit for a down-the-hole drill hammer comprising:
 a shank; and
 a head extending from the shank, the head including:
  a first plurality of cutting members defining an inner circumferential cutting path in a spiral configuration, and
  a second cutting member defining an outer most circumferential cutting path that overlaps the inner circumferential cutting path.

10. The drill bit of claim 9, wherein the head further includes a plurality of cutting members arranged in an outer most circumferential configuration circumscribing the first plurality of cutting members.

11. The drill bit of claim 9, wherein the head includes a distal face for engaging earthen terrain and the first and second cutting members are arranged about the distal face.

12. The drill bit of claim 9, wherein the first and second cutting members are arranged in a three dimensional non-concentric or spiral configuration.

13. A method of manufacturing a drill bit for a down-the-hole drill hammer comprising:
 forming a first set of spaced apart receiving holes in a drill bit face of the drill bit in a spiral configuration; and
 forming a second set of spaced apart receiving holes in a circumferential configuration circumscribing the first set of spaced apart receiving holes such that grooves created by each of the first and second set of receiving holes upon operation of the drill bit overlap each other.

\* \* \* \* \*